(12) United States Patent
Pearson

(10) Patent No.: US 6,203,696 B1
(45) Date of Patent: Mar. 20, 2001

(54) FLUID DRIVEN PUMPS AND APPARATUS EMPLOYING SUCH PUMPS

(76) Inventor: Colin Pearson, 35 Claremont Road, London N6 5DA (GB)

( * ) Notice: Subject to any disclaimer, the term of this patent is extended or adjusted under 35 U.S.C. 154(b) by 0 days.

(21) Appl. No.: 09/315,651

(22) Filed: May 20, 1999

Related U.S. Application Data

(63) Continuation of application No. PCT/GB97/03208, filed on Nov. 21, 1997.

(30) Foreign Application Priority Data

Nov. 21, 1996 (GB) .................................................. 9624205
Apr. 11, 1997 (GB) .................................................. 9707346

(51) Int. Cl.$^7$ .................................................. F04B 35/02
(52) U.S. Cl. ...................... 210/98; 210/137; 210/321.66; 210/416.1; 137/513.3; 417/399; 417/377
(58) Field of Search ................ 210/137, 416.1, 210/416.3, 321.66, 98, 97, 321.6, 321.65; 417/313, 392, 393, 399, 377, 401; 137/513.3, 576; 91/329, 341 A, 341 R

(56) References Cited

U.S. PATENT DOCUMENTS

| Re. 32,144 | 5/1986 | Keefer .................................. 210/637 |
| Re. 33,135 | 12/1989 | Wanner .................................. 417/377 |
| 516,410 | * 3/1894 | Steitz ........................................ 91/24 |
| 3,331,330 | * 7/1967 | Harklau et al. ...................... 417/393 |
| 3,626,968 | * 12/1971 | Hancock . | |
| 4,332,368 | * 6/1982 | Woloszczuk ...................... 251/30.02 |
| 4,367,140 | * 1/1983 | Wilson . | |
| 4,913,809 | 4/1990 | Sawada et al. .......................... 210/98 |
| 5,462,414 | 10/1995 | Permar .................................. 417/313 |

FOREIGN PATENT DOCUMENTS

| 0028913 | 5/1981 | (EP) . |
| 0397332 | 11/1990 | (EP) . |
| 2492470 | 10/1981 | (FR) . |
| 2732727 | 10/1996 | (FR) . |
| 2162591 | 2/1986 | (GB) . |
| 2277575 | 11/1994 | (GB) . |

* cited by examiner

Primary Examiner—W. L. Walker
Assistant Examiner—Terry K. Cecil
(74) Attorney, Agent, or Firm—Hodgson, Russ, Andrews, Woods & Goodyear LLP

(57) ABSTRACT

A reverse osmosis or filtration system uses one or more hydraulic intensifiers (integrated motor and pump) to provide all the high pressure fluid to a semi-permeable membrane or filter, the intensifier being powered by the high pressure flushing flow leaving the membrane or filter uses, and by a pressurized inlet flow of fluid to be purified or filtered. The intensifier or pump comprises reciprocable means having a pair of first pressure surfaces and a pair of second pressure surfaces each bounding a respective first and second pressure chamber, control valve means to supply pressure fluid alternately to the chamber bounded by one of the first surfaces and to exhaust pressure fluid from the chamber bounded by the other of the first surfaces thereby causing the reciprocable means to reciprocate, fluid inlet and outlet valve means communicating with the chambers bounded by the second surfaces whereby the second surfaces pump fluid through the second chambers upon reciprocation of reciprocable means, the control valve means comprising a plurality of primary poppet valves each having a secondary bleed valve to reduce a force necessary to operate the valve.

31 Claims, 3 Drawing Sheets

… … …

FLUID DRIVEN PUMPS AND APPARATUS EMPLOYING SUCH PUMPS

This application is a continuation of PCT/GB97/03208, filed Nov. 21, 1997.

BACKGROUND OF THE INVENTION

The invention relates to a fluid driven pump suitable for use in a reverse osmosis or filtration system for example a water purifying system, and to a system employing such a pump.

The preferred embodiment of the current invention provides a high pressure fluid output flow from two or more lower pressure fluid input flows. It is specifically but not exclusively intended to provide high pressure water for purification by reverse osmosis, where water contaminated by unwanted solutes is forced, at a pressure of typically 60 bar, through a semi-permeable membrane, effectively filtering out those solutes. This process is typically used for desalination of seawater.

It is a characteristic of reverse osmosis that the flow of contaminated water across the membrane needs to be typically ten times greater than the flow of purified water through the membrane, the excess flow acting to flush away contaminants accumulated at the membrane surface. In the simplest systems, this high pressure flushing flow is released to waste, taking with it, and wasting, typically 90% of the energy used to provide the high pressure input flow.

There are established methods to recover the energy contained in the high pressure flushing flow . . .

It may be used to drive a hydraulic motor mechanically coupled to the pressurising pump, with the balance of energy input provided by, for example, an electric motor. This method is complex and consequently expensive, with inevitable inefficiencies in the indirect mechanical transfer of energy. Standard, relatively inexpensive, hydraulic motors cannot be used since they are designed for use with hydraulic oils, relying on them for lubrication.

It may be used more directly to provide part of the energy used by the pressurising pump. U.S. Pat. No. Re.32,144 and U.S. Pat. No. Re.33,135 describe mechanically driven reciprocating-piston pumps where one side of the piston and cylinder act as a pump and the other side acts as a motor, driven by the flushing flow to provide most of the pumping power.

A further characteristic of reverse osmosis is that the contaminated water input flow needs to be thoroughly filtered, to prevent clogging of the membrane by particulates. It is often cost-effective to provide an additional low-pressure pump to drive the contaminated water input flow through the filter, since this allows a higher pressure drop across the filter, typically 1 bar, enabling a smaller and cheaper filter to be used. Without this additional pump, the pressure drop across the filter would limited to around 0.5 bar by the poor ability of the high pressure pump to suck against low pressures. The additional pump will also be required if, as is often the case, the high pressure pump is not self-priming.

The preferred embodiment of the invention is directed to avoiding or mitigating at least some of the disadvantages of these known devices.

SUMMARY OF THE INVENTION

In one aspect the invention provides a reverse osmosis or filtration system comprising a semi-permeable membrane or filter, a pump arranged to supply all high pressure fluid delivered to the membrane or filter, part of the said fluid passing through the membrane or filter as purified or filtered fluid, the remainder being a flow of return or flushing fluid which is returned to the pump, the pump being powered only by the return fluid and by an inlet flow of pressurised fluid to be purified or filtered.

The pump may comprise reciprocable means bounding a pair of first pressure chambers which alternately receive and exhaust return fluid to reciprocate the reciprocable means and a pair of second chambers also bounded by the reciprocable means and which alternately receive the pressured inlet fluid and deliver fluid at high pressure to the semi permeable membrane or filter.

The swept volume of the second chamber may be greater than that of the first chamber.

There may be valve means for controlling the admission and exhaust of pressure fluid to and from the first pressure chambers, the valve means comprising bistable elements elements movable between two positions and stable only in those positions, responsive to fluid pressure across them.

The valve means may comprise a plurality of primary poppet valves each having a secondary bleed valve to reduce a force necessary to operate the valve.

It will be appreciated that the pistons need not be part of a single reciprocable body (although this is preferred) nor need they reciprocate linearly. For example the invention can be realised using angular reciprocation.

However it is preferred that the reciprocable means comprises two double-acting pistons reciprocable in respective cylinders with co-linear axes, opposite faces of each piston respectively bounding a said first and a said second chamber defined by the cylinder, said pistons being joined by a common piston rod passing through a wall between the inner ends of the two cylinders, valve means to control fluid flow in and out of the enclosed volumes in each cylinder at either side of each piston, the pump having two alternating working strokes, a first working stroke supplying fluid to the membrane or filter from the outer face of the first piston and fluid to waste from the inner face of the second piston, the return or flushing flow being applied to the inner face of the first piston, the pressurised inlet flow being applied to the outer face of the second piston, a second working stroke being the reverse of the first working stroke.

In another aspect the invention provides a fluid operated pump comprising reciprocable means having a pair of first pressure surfaces and a pair of second pressure surfaces each bounding a respective first and second pressure chamber, control valve means to supply pressure fluid alternately to the chamber bounded by one of the first surfaces and to exhaust pressure fluid from the chamber bounded by the other of the first, surfaces thereby causing the reciprocable means to reciprocate, fluid inlet and outlet valve means communicating with the chambers bounded by the second surfaces whereby the second surfaces pump fluid through the second chambers upon reciprocation of the reciprocable means, the control valve means comprising a plurality of primary poppet valves each having a secondary bleed valve to reduce a force necessary to operate the valve.

The pistons may be coaxial and the first surfaces of the pistons may face in opposite directions.

The pressure chambers bounded by the first pressure surfaces may be arranged between those surfaces and separated by common wall structure.

The control valves may be operated by the pistons when the pistons reach the extremities of their stroke.

Preferably a said control valve is disposed in the common wall structure.

Two said control valves in the common wall structure may comprise a moveable element which is common to both valves.

A said control valve may comprise a moveable element stable only at the extremes of its travel.

The second surfaces may be of greater effective area than the first surfaces.

It is a feature of the preferred forms of the invention that single moving elements each act as both pump and motor, with the driving pressure applied to one part of each element while another part pressurises the pumped flow. In the preferred embodiment the pumps provide the high pressure input flow to the semi-permeable membrane, and are driven by the motors. One motor is powered by the high pressure flushing flow leaving the membrane, while the other is powered by the contaminated water input flow. This input flow is provided at moderate pressure, typically 5 to 10 bar, by a separate pump, which may be of a conventional type.

The benefits provided by the preferred embodiment of the current invention are . . .

It recovers the energy otherwise wasted in the high pressure flushing flow, increasing system efficiency typically by a factor of ten.

It has minimal mechanical losses, since the driving pressure is applied as directly as possible to provide pumping effort.

It offers great simplicity, and consequent low manufacturing cost, since mechanical drives and linkages are eliminated.

It enables the system to be powered by a single self-priming externally-driven pump. Since this need deliver only moderate pressure, it may be of a common, massproduced and consequently inexpensive type.

The preferred form of the current invention differs from existing hydraulic intensifiers, which provide a single high pressure output flow from a single moderate pressure input flow, in that it receives two input flows, one at high pressure and one at moderate pressure, to provide a single high pressure output. In particular, when used in a reverse osmosis apparatus, it differs from those described in U.S. Pat. No. Re.32,144 and U.S. Pat. No. Re.33,135, mentioned above, in that all of the driving power is provided by the contaminated water input flow, and none by other mechanical means. U.S. Pat. No. Re.32,144 covers supplementation, only, of mechanical power input by pressurisation of the feed fluid, since the mechanical drive is required to maintain the sequence of operations and to drive the valve mechanism.

BRIEF DESCRIPTION OF THE DRAWINGS

A preferred embodiment of the invention will now be described by way of example only with reference to the accompanying drawings, in which.

DETAILED DESCRIPTION OF THE INVENTION

Figure 1:
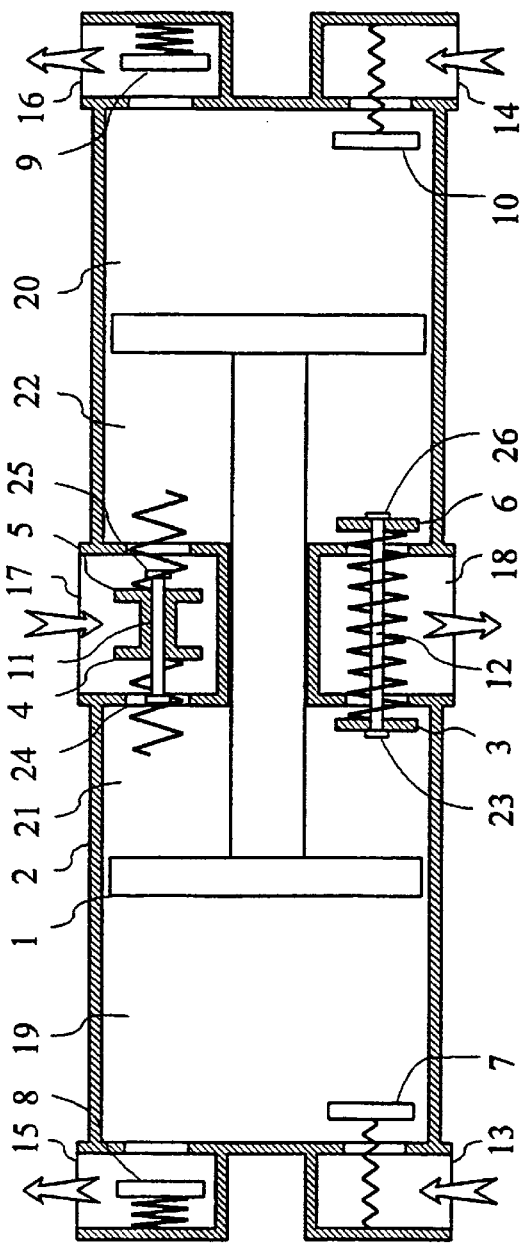
FIGS. 1 to 4 are schematic cross-sections of a preferred pump at various stages of its operating cycle.

FIG. 1 shows the device at start up. A piston assembly, 1, consists of two pistons, one at either end of a piston rod. The piston assembly can move freely inside a cylinder assembly, 2, with seals to prevent leakage between the cylinders around the piston rod, and between each end of each cylinder around each piston. Each piston has a first pressure surface respectively bounding an inner cylinder 21, 22, and a second pressure surface respectively bounding an outer cylinder 19, 20. The inner and outer cylinders constitute first and second pressure chambers respectively. Water may flow into and out of each end of each cylinder through eight valves, 3 to 10. Valves 7 to 10 are non-return valves biased closed by spring means and opened by water pressure. Valves 4 and 5 are poppet valves rigidly connected to each other, and are operated by spring means which protrude into the cylinders, where they are contacted by the pistons. A spindle, 11, passes through a hole in the valve assembly, 4 and 5, with clearance to allow flow through the hole. At each end of the spindle there are pilot valve or bleed valves 24 and 25, which, when one or other are closed, seal the spindle hole. Poppet valves 3 and 6 are flexibly connected together by a spring means, and are operated by contact with the pistons. A spindle, 12, passes through holes in valves 3 and 6, with clearance to allow flow through the holes. At each end of the spindle there are pilot valve or bleed valves 23 and 26, which, when closed, seal the adjacent holes.

Ports 13 and 14 are connected to a medium pressure water supply, Ports 15 and 16 are connected to the high pressure inlet of a reverse osmosis membrane. Port 17 connects with the high pressure flushing water outlet of the membrane. Port 18 exhausts water to waste at low pressure.

When the medium pressure water supply is applied to ports 13 and 14, water flows into the outer cylinders 19 and 20, through valves 7 and 10, then out through valves 8 and 9 to the membrane via ports 15 and 16. Flushing water returning from the high pressure side of the membrane enters the inner cylinders via port 17 and valves 4 and 5. It then exhausts to waste at low pressure via valves 3 and 6 and port 18. Valve pairs 4 and 5, and 3 and 6, are configured to be stable only at their extremes of travel when water is passing through them. This causes, for example, valves 4 and 6 to close while valves 3 and 5 open. Pilot valves 25 and 26 are also closed by the pressure across them. Closure of these valves stops water flow, causing valves 7, 8, 9 and 10 to close under spring pressure, and controlling the timing operation thereof.

Figure 2:
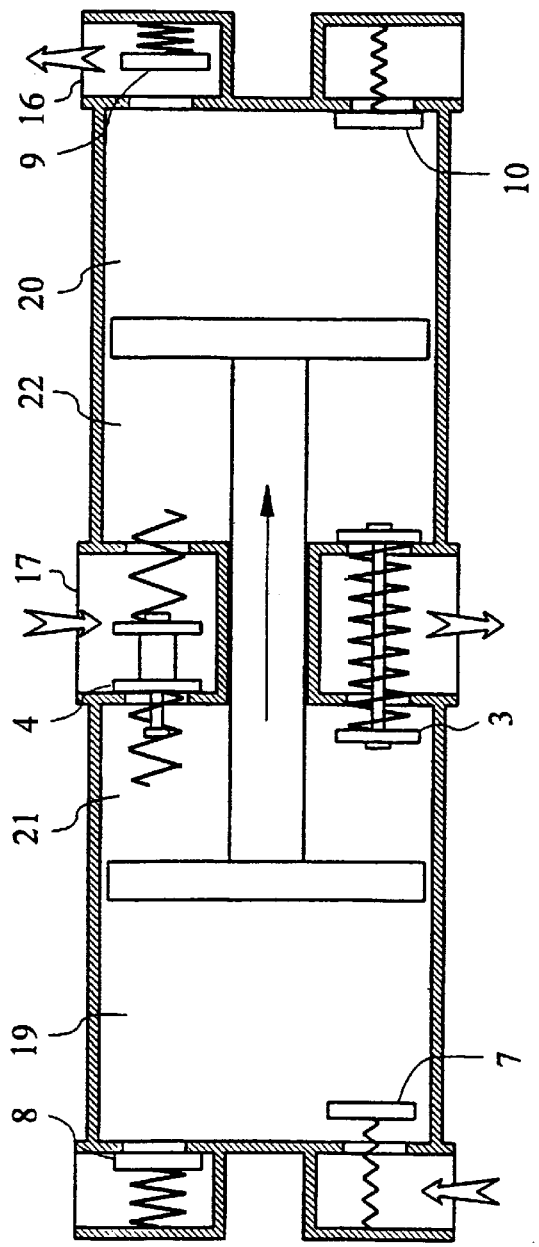

FIG. 2 shows the next stage of operation. The outer cylinders, 19 and 20, and the right hand inner cylinder, 22, are all at medium pressure. The left hand inner cylinder, 21, is at low pressure, being open to waste via valve 3. The overall pressure differential across the pistons causes the piston assembly to move to the right, creating water flow which opens valves 7 and 9, while leaving valves 8 and 10 closed. Water from the right hand outer cylinder now flows out to the membrane through port 16, and returns through port 17 into the right hand inner cylinder. The outward flow is greater than the return flow, since the cross-sectional area of the outer cylinder and hence its swept volume (effective piston area times the stroke) is greater than that of the inner cylinder, by an amount equal to the cross-sectional area of the piston rod. Because of this, the pressure on the high pressure side of the membrane increases, forcing the excess outward flow through the membrane, purifying it in the process. The piston assembly will continue to move, forcing water through the membrane, provided that . . .

$Pm.Ao > Pl.Ai + Ph.Ao - (Ph-dP) A$ where . . .

$Pm$ = medium pressure, applied to drive the system
$Pl$ = low pressure, to which waste water exhausts
$Ph$ = high pressure, applied to membrane
$dP$ = pressure drop of membrane flushing flow
$Ao$ = cross-sectional area of outer cylinder Ai=cross-sectional area of inner cylinder (=Ao−cross-sectional area of piston rod)

or, rearranging and assuming low pressure=0 . . .

Pm>Ph.(1−Ai/Ao)+dP.Ai/Ao

. . . where (1−Ai/Ao) is the ratio of freshwater output flow to flushing water flow. This would typically be 0.1, while the membrane pressure would be 60 bar, implying a driving pressure of around 7 bar.

Figure 3:
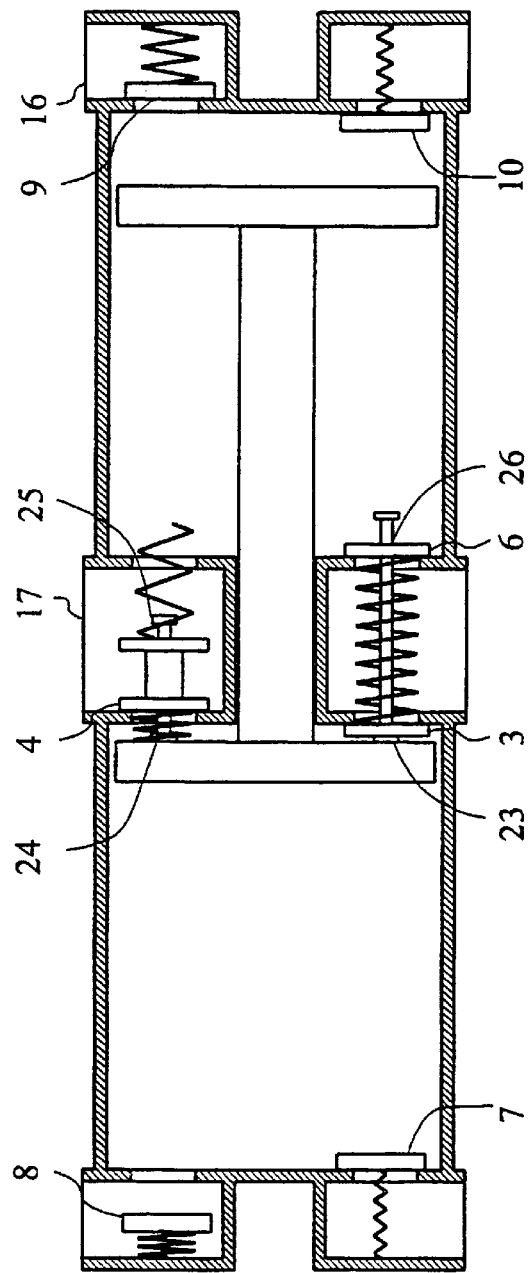
Figure 4:
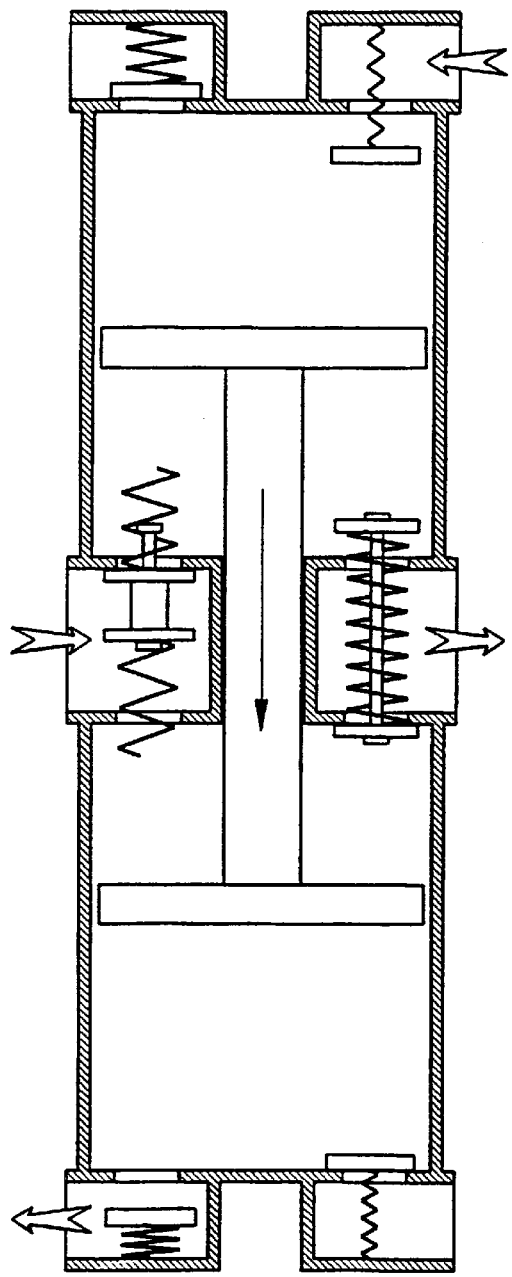

FIG. 3 shows the next stage of operation, where the piston assembly has reached the end of its stroke. The left-hand piston has contacted and closed valves 3 and 23, compressed the spring between valves 3 and 6, compressed the spring on valve 4, and opened pilot valve 25 without closing pilot valve 24, and opened pilot valve 26. The flow through pilot valve 26 is restricted to minimise the loss of high pressure water to waste. Valves 7,8,9 and 10 close under spring pressure since the flow through them is stopped. There is high pressure in the right-hand inner and outer cylinders, and medium pressure in the left-hand inner and outer cylinders. Valve 4 is held closed by the pressure differential across it, until the left-hand inner cylinder has reached high pressure, via flow through pilot valves 24 & 25. Valve 4 is then opened by its associated spring, and valve 5 closes. Once valve 5 is closed, flow through pilot valve 26 reduces the right hand inner cylinder pressure to low pressure and valve 6 is opened by the spring connecting it to valve 3. At this point there is high pressure in the left-hand inner and right-hand outer cylinders, low pressure in the right-hand inner cylinder, and medium pressure in the left-hand outer cylinder, causing the piston assembly to start moving to the left. As soon as this happens, valve 10 opens to admit medium pressure to the right-hand outer cylinder and valve 8 opens to release high pressure to the membrane. This state is shown in FIG. 4, and is the reverse or mirror image of the state shown in FIG. 2, while the stroke reversal at the end of the leftward-moving stroke is a mirror image of that described for FIG. 3. The piston assembly thus continues to oscillate.

Figure 5:
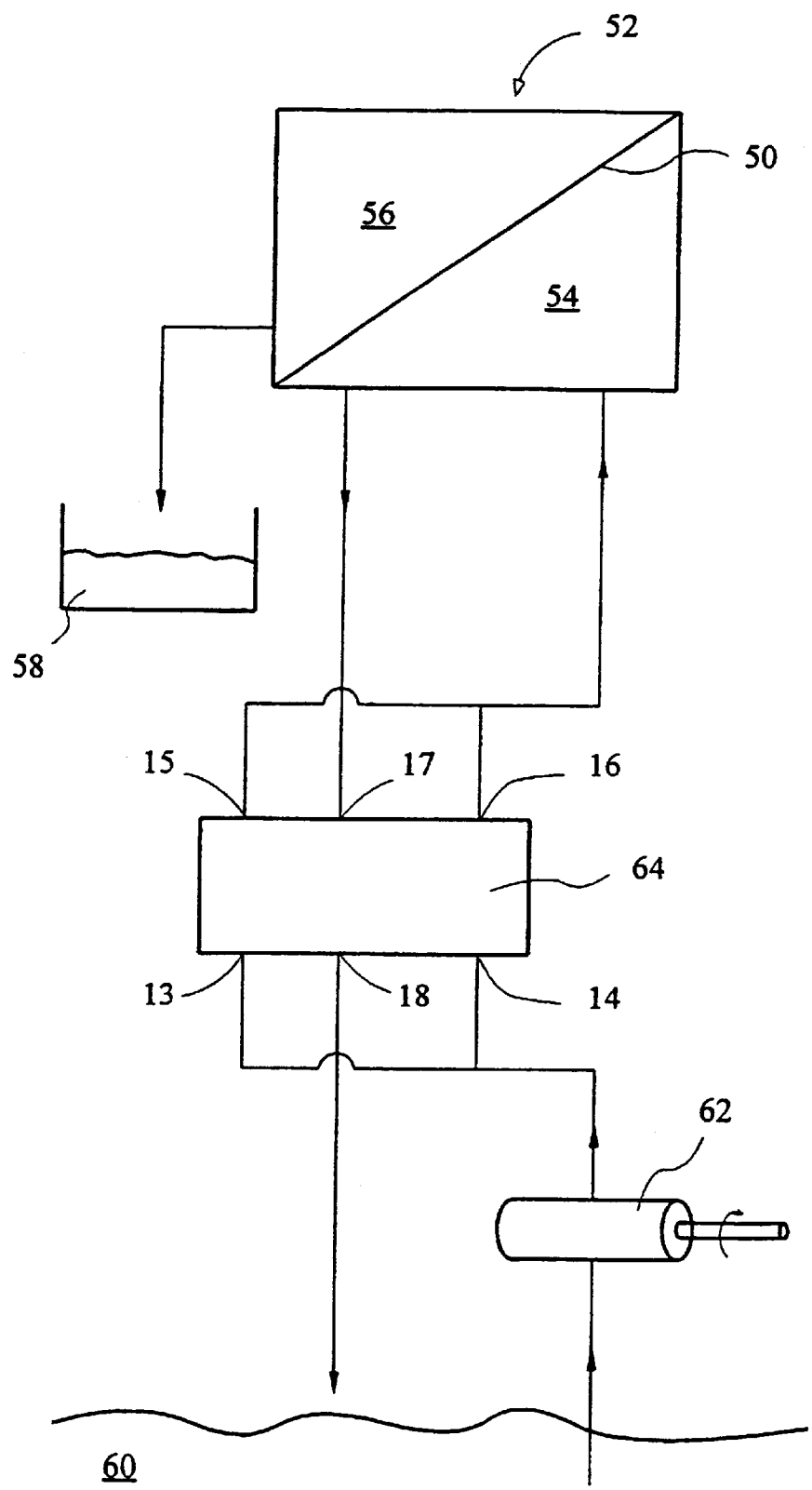
FIG. 5 shows a reverse osmosis system incorporating the pump of FIGS. 1 to 4.

FIG. 5 shows diagrammatically a reverse osmosis system utilising the pump of FIGS. 1 to 4. A semi-permeable membrane 50 is disposed in a pressure vessel 52, so that a proportion of brine delivered to one (high pressure) side 54 of the membrane permeates through the membrane to the other (low pressure) side 56 thereof and is thereby purified as known per se. The pure water thereby obtained is taken to a storage tank 58.

The brine is abstracted from the sea 60 (the system typically may be installed in a yacht or other vessel) by a conventional electrically, or mechanically driven medium pressure sea—water pump 62 and delivered to a inlet 13, 14 (FIGS. 1 to 4) of high pressure pump or intensifier 64, which is as already described. High pressure brine is delivered from outlets 15, 16 to the vessel 52. That proportion of the brine which does not pass through the membrane flushes through the high pressure side 54 of the vessel 52 and returns still under high pressure to inlet 17 of pump 64. The flushing flow, and the medium pressure flow to inlets 13 and 14, drive the pump 64 as its sole source of power. The flushing flow discharged from outlet 18 of the pump 64 is returned to the sea 60.

It will be appreciated that the pump as described may be employed with any form of reverse osmosis or filtration system in which the flow leaving the osmosis or filtration element is still under significant pressure.

Each feature disclosed in this specification (which term includes the claims) and/or shown in the drawings may be incorporated in the invention independently of other disclosed and/or illustrated features.

The appended abstract is repeated as part of the specification.

A reverse osmosis or filtration system uses one or more hydraulic intensifiers (integrated motor & pump) to provide all the high pressure fluid to a semi-permeable membrane or filter, the intensifier being powered by the high pressure flushing flow leaving the membrane or filter, and by a pressurised inlet flow of fluid to be purified or filtered.

The intensifier or pump comprises reciprocable means having a pair of first pressure surfaces and a pair of second pressure surfaces each bounding a respective first and second pressure chamber, control valve means to supply pressure fluid alternately to the chamber bounded by one of the first surfaces and to exhaust pressure fluid from the chamber bounded by the other of the first surfaces thereby causing the reciprocable means to reciprocate, fluid inlet and outlet valve means communicating with the chambers bounded by the second surfaces whereby the second surfaces pump fluid through the second chambers upon reciprocation of reciprocable means, the control valve means comprising a plurality of primary poppet valves each having a secondary bleed valve to reduce a force necessary to operate the valve.

What is claimed is:

1. A reverse osmosis or filtration system comprising a semi-permeable membrane or filter, a pump arranged to supply all high pressure fluid delivered to the membrane or filter, part of said fluid passing through the membrane or filter as purified or filtered fluid, the remainder of said fluid being a flow of return fluid, which is returned to the pump, the pump being powered only by the return fluid and by an inlet flow of pressurized fluid to be purified or filtered, the pump comprising reciprocable elements bounding a pair of first pressure chambers which alternately receive and exhaust return fluid via control valves to reciprocate the reciprocable elements between extremities of reciprocation, a pair of second chambers also bounded by the reciprocable elements and which alternately receive the pressurized inlet fluid and deliver fluid at high pressure to the semipermeable membrane or filter, the control valves operating at the extremities of reciprocation of the reciprocable elements and being subjected to the pressure of fluid in the first pressure chambers, and a bleed valve permitting limited flow past a said control valve to modify the pressure in a said first chamber whereby to control the timing of operation of the said control valve.

2. A system as claimed in claim 1 wherein the control valve is mechanically biased by the reciprocable elements at the extremities of reciprocation.

3. A system as claimed in claim 2 wherein the said control valve comprises an element responsive to a fluid pressure difference across it.

4. A system as claimed in claim 2 wherein the control valves are operated by contact with the reciprocable elements.

5. A system as claimed in claim 1 wherein the first and second chambers have swept volumes, and the swept volume of the second chamber is greater than that of the first chamber.

6. A system as claimed in claim 1 wherein the said control valve comprises an element responsive to fluid a pressure difference across it.

7. A system as claimed in claim 1 wherein the said control valve comprises a primary poppet valve, said bleed valve being a secondary valve in the poppet valve.

8. A system as claimed in claim 1 wherein said reciprocating elements comprise two double-acting pistons reciprocable in respective cylinders, opposite faces of each piston respectively bounding a said first and a said second chamber defined by the cylinder, said pistons being joined by a common piston rod passing through a wall between said respective cylinders.

9. A system as claimed in claim 8 wherein the control valves are operated by contact with the pistons.

10. A fluid-operated pump comprising reciprocable elements having a pair of first pressure surfaces and a pair of second pressure surfaces each bounding a respective first and second pressure chamber, control valves to supply pressure fluid alternately to the chamber bounded by one of the first surfaces and to exhaust pressure fluid from the chamber bounded by the other of the first surfaces thereby causing the reciprocable elements to reciprocate, fluid inlet and outlet valves communicating with the chambers bounded by the second surfaces whereby the second surfaces pump fluid through the second chambers upon reciprocation of the reciprocable elements, a said control valve comprising a primary valve which is closed when subject to a predetermined pressure difference across it and a secondary bleed valve for selectively reducing the pressure difference across the primary valve, whereby the primary valves open sequentially at the extremities of reciprocation of the reciprocable elements.

11. A pump as claimed in claim 10 wherein the said primary valve is mechanically biased, the bleed valve modifying a pressure difference across the primary valve to reduce the required operating force to less than the mechanical bias to which the primary valve is subjected.

12. A pump as claimed in claim 11 where the control valves are operated by the pistons when the pistons reach the extremities of their stroke.

13. A pump as claimed in claim 12 wherein the pressure chambers bounded by the first pressure surfaces are arranged between those surfaces and are separated by common wall structure and wherein a said control valve is disposed in the common wall structure.

14. A pump as claimed in claim 13 wherein two said control valves are in the common wall structure comprise a movable element which is common to both valves.

15. A pump as claimed in claim 10 wherein the reciprocable elements are a pair of connected pistons.

16. A pump as claimed in claim 15 wherein the pistons are coaxial and the first surfaces of the pistons face in opposite direction.

17. A pump as claimed in claim 16 where the pressure chambers bounded by the first pressure surfaces are arranged between those surfaces and are separated by common wall structure.

18. A pump as claimed in claim 17 where the control valves are operated by the pistons when the pistons reach the extremities of their stroke.

19. A pump as claimed in claim 17 wherein a said control valve is disposed in the common wall structure.

20. A pump as claimed in 19 wherein two said control valves are in the common wall structure and comprise a movable element which is common to both valves.

21. A pump as claimed in claim 15 where the control valves are operated by the pistons when the pistons reach the extremities of their stroke.

22. A pump as claimed in claim 10 wherein a said control valve comprises a movable element movable between two positions, and which is stable only in said positions.

23. A pump as claimed in claim 10 wherein the second surfaces are of greater effective area than the first surfaces.

24. A pump as claimed in claim 10 wherein the said primary valve is a poppet valve.

25. A reverse osmosis or filtration system comprising a pump as claimed in claim 10.

26. A reverse osmosis system as claimed in claim 25 wherein the second surfaces are of greater effective area than the first surfaces and the difference in swept volume between the pressure chambers bonded by the second surfaces and the first surfaces provides pressure fluid which passes through a semi-permeable membrane or filter of the apparatus.

27. A fluid operated pump comprising reciprocable elements bounding a pair of first pressure chambers which alternately receive and exhaust pressure fluid via control valves to reciprocate the reciprocable elements, a pair of second chambers also bounded by the reciprocable elements and which alternately receive inlet fluid and deliver output fluid at high pressure, the control valves operating at the extremities of reciprocation of the reciprocable elements and being subjected to the pressure of fluid in the first pressure chambers, and a bleed valve permitting limited flow past a said control valve to modify the pressure in a said first chamber whereby to control the timing of operation of the said control valve.

28. A pump as claimed in claim 27 wherein the first and second chambers have swept volumes, and the swept volume of the second chamber is greater than that of the first chamber.

29. A pump as claimed in claim 27 wherein the said control valve comprises an element responsive a to fluid pressure difference across it.

30. A pump as claimed in claim 27 wherein the reciprocable elements are a pair of connected pistons.

31. A pump as claimed in claim 27 where the control valves are operated by the pistons when the pistons reach the extremities of their stroke.

* * * * *